US007132022B2

United States Patent
Ogle et al.

(10) Patent No.: US 7,132,022 B2
(45) Date of Patent: Nov. 7, 2006

(54) BI-LAYER NONWOVEN FIRE RESISTANT BATT AND AN ASSOCIATED METHOD FOR MANUFACTURING THE SAME

(75) Inventors: Steven E. Ogle, Murfreesboro, TN (US); D. Patrick Steagall, Mooresville, NC (US); Kenneth C. Thompson, Antioch, TN (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 11/088,657

(22) Filed: Mar. 23, 2005

(65) Prior Publication Data

US 2005/0233668 A1    Oct. 20, 2005

Related U.S. Application Data

(60) Provisional application No. 60/556,136, filed on Mar. 23, 2004.

(51) Int. Cl.
*B32B 27/36* (2006.01)
*D04H 1/42* (2006.01)

(52) U.S. Cl. .................... 156/62.2; 156/62.8; 264/112; 264/113; 442/327; 442/381; 442/359; 442/415

(58) Field of Classification Search .................... None
See application file for complete search history.

(56) References Cited

U.S. PATENT DOCUMENTS 3,616,124 A * 10/1971 Danhel et al. .............. 428/174
4,818,586 A *  4/1989 Smith et al. ................ 428/198

FOREIGN PATENT DOCUMENTS

WO    WO 200168341 A1 *  9/2001
WO    WO 2003023108 A1 *  3/2003

OTHER PUBLICATIONS

Textile World The 2003 Man-Made Fiber Chart.*

* cited by examiner

*Primary Examiner*—Sam Chuan Yao
(74) *Attorney, Agent, or Firm*—Conley Rose, P.C.; Kristin Jordan Harkins; Michael S. Bush

(57) ABSTRACT

A bi-layered fire resistant (FR) nonwoven fiber batt and an associated method for manufacturing the same. The bi-layered FR nonwoven fiber batt includes a first, gray, FR layer, formed from a blend of black oxidized polyacrylonitrile (oxidized PAN), white dry polyester carrier fibers and white low-melt polyester binder fibers, and a second, white, layer, formed from a blend of white FR rayon, white dry polyester carrier fibers and white low-melt polyester binder fibers, disposed in a conforming relationship with the first, gray, FR layer.

18 Claims, 3 Drawing Sheets

BI-LAYER NONWOVEN FIRE RESISTANT BATT AND AN ASSOCIATED METHOD FOR MANUFACTURING THE SAME

CROSS-REFERENCE TO RELATED APPLICATIONS

This Application is related to and claims priority from U.S. Provisional Patent Application Ser. No. 60/556,136 filed Mar. 23, 2004 and hereby incorporated by reference as if reproduced in its entirety.

This Application is also related to U.S. Nonprovisional patent application Ser. No. 11/088,658 filed on even date herewith and hereby incorporated by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE DISCLOSURE

The present invention relates to a bi-layer nonwoven fire resistant (FR) batt and an associated method for manufacturing the same. More particularly, the present invention relates to a bi-layer nonwoven FR batt which achieves improved aesthetics without a corresponding degradation in the FR characteristic of the batt.

BACKGROUND

FR products are desirable in a wide variety of applications. Products for both private occupancy such as homes and public occupancy such as health care facilities, convalescent care homes, college dormitories, residence halls, hotels, motels and correctional institutions are sometimes governed by regulations which require components having certain FR characteristics for the materials used to construct such products. This is particularly true when bedding and upholstered products are concerned. Components having certain FR characteristics are also needed in a wide array of other applications where fire safety is a concern, including, but not limited to apparel, fire safety gear, vehicle and aircraft seating and walls, as insulators for appliances, walls and duct work and as barriers to separate sensitive controls from heat sources. Generally speaking, a FR product minimizes the amount and rate of heat released from the product upon contact with fire or other source of ignition. The rate of heat released is an indication of the intensity of the fire generated from the FR product as well as how quickly the fire spreads. Slowing the spread of fire advantageously increases the amount of response time for a person in dangerous proximity to the fire to move to a place of safety and a fire department or other public or private safety agency to successfully extinguish the fire.

In the bedding, upholstery and other industries, foams and nonwoven fibers are often used as components of mattresses, sofas, chairs, and seat cushions, backs and arms. Traditionally, urethane foam has been combined with other types of cushioning materials such as cotton batting, latex rubber, and various nonwoven fibers in order to impart desirable comfort, loft and durability characteristics to a finished product. Of these, however, urethane foam is extremely flammable and must be chemically treated or coated to impart FR properties thereto. As it is relatively fire resistant, neoprene foam is often used in bedding and upholstery products as well. However, as both neoprene foam and urethane foam which has been treated to enhance the FR properties thereof are relatively expensive, cost constraints may limit the applications for which neoprene foam and treated urethane are commercially suitable.

Correctional institutions typically use three types of cushion cores for mattresses. The cushion cores include foam, densified synthetic nonwoven fiber which has a density of about 1.5 pounds per cubic foot or greater, and cotton batting. Left untreated, cotton fibers are extremely flammable and burn rapidly. Cotton can, however, be chemically treated, typically with boric acid, to impart fire resistant properties to the cotton. Correctional institutions with heightened fire safety concerns may require their mattresses to meet certain fire safety standards. In these cases, the cushion cores are comprised of neoprene foam or cotton batting which has been treated with boric acid. However, cotton is extremely moisture absorbent. Thus, mattresses comprised of cotton are difficult to maintain in a hygienic condition. Furthermore, cotton mattresses are relatively heavy.

Synthetic and natural nonwoven fibers also have demonstrated usefulness in the construction of FR mattresses and upholstery. Such fibers are inherently lightweight and therefore easy to ship, store and manipulate during processing. When subjected to open flame, many synthetic fibers, particularly polymer fibers and, more specifically, dry polyester fibers, tend to melt and drip rather than burn. In addition, polymer fibers can be coated for fire resistance. For example, polymer fibers which have been treated for fire resistance are commercially available, for example, the polymer fibers marketed under the trade names Trevira FR, Kelvar and Nomex are generally considered to be non-flammable polymer fibers.

Oxidized polyacrylonitrile (oxidized PAN) fibers provide a relatively high degree of fire resistance at a relatively low cost. However, oxidized PAN fibers are difficult to process into batts for use as a barrier layer or filling, particularly in bedding and upholstery applications. More specifically, oxidized PAN fibers are relatively low in weight and specific gravity, thereby making traditional carding methods used to form batts difficult. In addition, oxidized PAN fibers are so-called "dead" fibers because of their relatively little resilience and loft and general incompressibility. In certain applications, in particular, bedding and upholstery applications, an oxidized PAN fiber batt may be unsuitable where comfort and loft are desired. Oxidized PAN fibers are also black in color and thus may be unsuitable in applications which require a light color beneath a light decorative upholstery or mattress layer.

International Patent Publication No. WO 01/68341 A1, which is hereby incorporated by reference as if reproduced in its entirety, disclosed a fire combustion modified batt which incorporated oxidized PAN as a component thereof. The fire combustion modified batt was formed from a blend of between about 5 percent and about 50 percent by volume of binder fibers, with the remaining amount being a blend of carrier and oxidized PAN fibers. In turn, the relative percent volume of oxidized PAN fibers to carrier fibers in the remaining blend would range anywhere from about 15 percent by volume to about 85 percent by volume. For high loft batts, typically, batts having less than a 2:1 ratio of weight (in ounces per square foot) to thickness (in inches.), it was preferred that the blend would include between about 10 percent and about 15 percent of binder fibers while, for densified batts, typically, batts having a 2:1 or greater ratio of weight (in ounces per square foot) to thickness (in inches), it was preferred that the blend would include between about 15 percent and about 40 percent of binder fibers. It was further preferred that the ratio of oxidized PAN fibers to carrier fibers would be about 50 percent to about 50 percent.

For products requirement additional loft, compressibility, resilience and comfort or a light color beneath decorative upholstery, International Patent Publication No. WO 01/68341 A further disclosed a fire combustion modified batt which, in addition to the web comprised of oxidized PAN and nonwoven fibers, also included an additional web comprising nonwoven fibers which were light in color. A surface of the nonwoven web was then disposed to a surface of the blended oxidized PAN fiber web in a conforming relationship to form a batt which was then heated, compressed and cooled together. Alternatively, it was further disclosed that the oxidized PAN web and the nonwoven web could be heated, compressed and cooled separately and then disposed together to form the batt. It was contemplated that in mattresses and seats having a light colored decorative covering, the batt comprising a first, dark colored, layer comprised of oxidized PAN and nonwoven fibers and a second, light colored, layer comprised of nonwoven fibers would be positioned with the second, light colored, layer proximate the decorative covering to shield it from the first, dark colored, layer comprised of oxidized PAN and nonwoven fibers.

SUMMARY OF THE INVENTION

In various embodiments thereof, the present invention is directed to a bi-layered FR nonwoven fiber batt and an associated method for manufacturing the same. The bi-layered FR nonwoven fiber batt includes a first, gray, FR layer, formed from a blend of black oxidized polyacrylonitrile (oxidized PAN), white dry polyester carrier fibers and white low-melt polyester binder fibers, and a second, white, layer, formed from a blend of white FR rayon, white dry polyester carrier fibers and white low-melt polyester binder fibers, disposed in a conforming relationship with the first, gray, FR layer.

BRIEF DESCRIPTION OF THE DRAWINGS

For a more complete understanding of the present invention, and for further details and advantages thereof, reference is now made to the following Detailed Description, taken in conjunction with the accompanying drawings, in which.

NOTATION AND NOMENCLATURE

Figure 1:
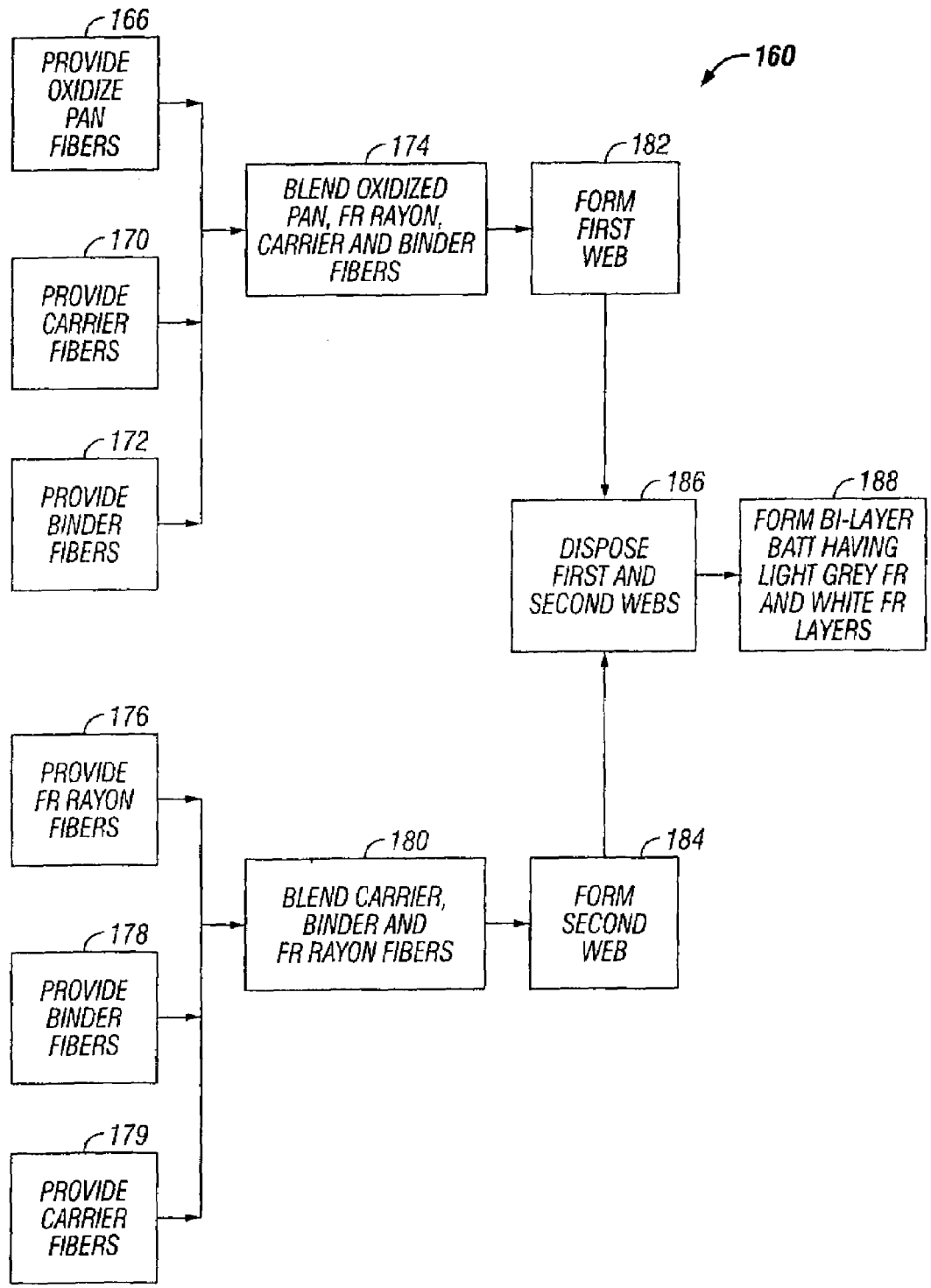
FIG. 1 is a flow chart of a method of forming a bi-layered FR batt in accordance with the teachings of the present invention.

Certain terms are used throughout the following description and claims to refer to particular components thereof. This document does not intend to distinguish between components that differ in name but not in function.

In the detailed description and claims which follow, the terms "including" and "comprising" are used in an open-ended function, and thus should be interpreted to mean "including, but not limited to . . . ".

The term "charring fibers" generally refers to inherently flame resistant fibers which carbonize into a charred fiber but will maintain a stable physical structure when exposed to an external source of ignition.

The terms "fire retardant" or "FR" generally refers to a component that burns slowly or is self-extinguishing after removal of an external source of ignition such as a flame. As used herein, the characterization of a component as being "FR" depends on whether it meets or exceeds the requirements of a flammability standard against which it is being tested or otherwise considered. For example, a mattress tested against the flammability standards for mattresses set forth in California TB 129 would be considered "not-FR" if a flame test performed in accordance with the test procedures set forth in TB 129 revealed that the mattress experienced: (1) a weight loss due to combustion of 3 pounds or greater in the first ten minutes of the test; (2) a maximum rate of heat release of 100 kW or greater; or (3) a total heat release of 25 MJ or greater in the first ten minutes of the test.

The term "flammability standard" generally refers to an objective measurement used to determine the flammability of a component. As used herein, a flammability standard encompasses both formal standards established by legislative bodies, administrative and/or other governmental agencies and private organizations as well as informal standards such as observations made during an exposure of at least one component to a source of ignition.

The term "FR characteristic" generally refers to a component's ability to resist consumption by flame. As used herein, the term provides a scale by which the relative FR of multiple components may be weighed. For example, a first component having a "greater" FR characteristic would resist being consumed by flame for a longer period of time than a second component having a "lesser" FR characteristic.

The term "FR treated rayon" generally refers to rayon fibers treated by applying a suitable flame retardant chemical thereto, thereby effectively rendering the rayon fibers inherently fire resistant.

The terms "inherently fire resistant" and "inherently FR" generally refer to materials, for example, oxidized PAN fibers that are classified as being FR because of the innate properties of the material. The terms "inherently fire resistant" and "inherently FR" also generally refer to materials that would ordinarily be classified as non-FR but, because of a treatment or other type of modification to the material, have been rendered FR because of an innate property of the treated or otherwise modified material.

In addition to its usual and customary meaning, the term "melt" or "melting" shall also refer to the gradual transformation of a fiber or, in the case of a bicomponent sheath/core fiber, the sheath of the fiber, over a range of temperatures within which the fiber becomes sufficiently soft and tacky to cling to other fibers with which it comes in contact.

The terms "non-fire retardant," "non-FR," "non-inherently FR" and "flammable" all generally refer to materials, for example, untreated rayon fibers, that will burn quickly, even after removal of an external source of ignition.

The term "gray" is used in a manner consistent with the recognized definition thereof. In other words, the term "gray" is "of a color that is a mixture or blend of black and white."

DETAILED DESCRIPTION

In the description that follows, an FR nonwoven fiber batt having a first, gray, FR layer and a second, white, FR layer is disclosed. It is contemplated that the disclosed FR nonwoven fiber batt is suitable for use in a variety of applications, including, but not limited to, applications as a fire barrier layer and as filling in bedding, upholstery and vehicle and aircraft seats, as insulators for apparel, appliances, walls, vehicle walls and duct work, as barriers to separate control systems from a heat source, and as components in fire safety gear, and the like. It is further contemplated that the disclosed FR nonwoven fiber batt is particularly well suited for applications which demand "visually aesthetic" nonwoven fiber batts and for which dark colored nonwoven fiber batts are generally considered unsuitable for use. The bedding and upholstery industries typically associate a "visually aesthetic" nonwoven fiber batt with a nonwoven fiber batt having a white color. While white nonwoven fiber batts are common, few, if any, white nonwoven fiber batts can be classified as FR batts. Likewise, FR nonwoven fiber batts are common. However, FR nonwoven fiber batts have traditionally been black or, at best, gray in color. For example, the aforementioned International Patent Publication No. WO 01/68341 disclosed a gray fire combustion modified batt. While the foregoing patent publication also appears to have disclosed the aforementioned gray fire combustion modified batt in combination with a white layer which would improve the aesthetics of the overall structure, the white layer clearly acted as a detriment to any FR characteristic enjoyed by the fire combustion modified batt.

Referring now to FIG. 1, a process 160 by which a bi-layer FR nonwoven fiber batt 162 is constructed in accordance with the teachings of the present invention will now be described in greater detail. Unlike prior FR nonwoven fiber batts, and as will be more fully described below, the bi-layer FR nonwoven fiber batt 162 provides an FR nonwoven fiber batt with significantly enhanced aesthetics without a significant sacrifice in fire retardancy. As will be more fully described below, the bi-layer FR nonwoven fiber batt 162 is comprised of a first, gray, FR layer 163 and a second, white, FR layer 164 such that the bi-layer FR nonwoven fiber batt 162 enjoys both a lighter overall coloring and lower construction costs relative to prior bi-layer FR nonwoven batts, by combining a first, gray, FR layer and a second, white, FR layer, thereby providing the greatly desired white coloring without significant degradation of the FR characteristic of the bi-layer FR nonwoven fiber batt 162. As a result, not only is the bi-layer FR nonwoven batt 162 suitable for a wider array of applications, employment of the bi-layer FR nonwoven batt 162 will also lower production costs associated with such applications while meeting or very likely exceeding applicable governmental regulations regarding FR characteristics of the resultant products.

As may be seen in FIG. 1, the process 160 commences by providing a first quantity of a first type of fiber at step 166. Similarly, a second quantity of a second type of fiber is provided at step 170 and a third quantity of a third type of fiber is provided at step 172. After the specified quantities of the first, second and third types of fibers have been provided, the method proceeds to step 174 where the provided quantities of the first, second and third types of fibers are blended together to form a first blend of plural fiber types.

In its broadest sense, the first type of fiber provided at step 166 for inclusion in the first blend of plural fiber types is any FR fiber of a sufficiently dark color which, as previously set forth, would render the FR fiber unsuitable for use in certain FR bedding, FR upholstery and any number of other FR applications where a white or relatively light colored FR batt is required. Preferably, the first type of fiber provided at step 166 for inclusion in the first blend of plural fiber types may be any black FR fiber or, more specifically, a black charring fiber or, even more specifically, a black FR oxidized PAN fiber. Similarly, in its broadest sense, the second type of fiber provide at step 170 may be a carrier fiber or, more specifically, a synthetic carrier fiber, or, even more specifically, a white dry polyester carrier fiber. Finally, the fourth type of fiber provided at step 172 for inclusion in the first blend of plural fiber types may be a binder fiber or, more specifically, a white low-melt polyester fiber.

The first blend of plural fiber types can be any one of a number of suitable blends. In one embodiment, the binder fiber can be anywhere in the range of about 5 percent to about 50 percent by volume of the blend. Typically, a nonwoven fiber batt formed from a fiber blend having between about 10 and about 15 percent, by volume, of binder fibers is considered to be a high loft batt while a nonwoven fiber batt formed from a fiber blend having between about 15 and about 40 percent, by volume, of binder fibers is considered to be a densified batt. The relative percent volume of the black FR oxidized PAN fibers and to the white polyester carrier fibers may range anywhere from about 15 percent to about 85 percent. In a preferred embodiment, the relative volume of the black FR oxidized PAN fibers to the white polyester carrier fibers is roughly 50 percent to 50 percent. Thus, for a blend having about 10 percent by volume of binder fibers and a roughly fifty percent to fifty percent relative volume of the black FR oxidized PAN fibers to the white dry polyester carrier fibers, the volume of white low-melt polyester binder fibers is about 10 percent, the volume of black FR oxidized PAN fibers is about 45.0 percent and the volume of white dry polyester carrier fibers is about 45.0 percent.

At either a prior, generally contemporaneously or successive point time that the first blend of plural fiber types, preferably, a blend of black FR oxidized PAN fiber, white polyester carrier fiber and white polyester binder fiber are provided and subsequently blended to form the first blend of plural types of fibers, a second blend of plural fiber types is also formed. More specifically, at step 176, a first type of fiber, preferably a white FR fiber or, more specifically, a white cellulosic fiber or, even more specifically, a white FR rayon fiber, is provided for inclusion in the second blend of plural fiber types, at step 178, a second type of fiber, preferably a white binder fiber or, more specifically, a white low-melt polyester fiber is provided for inclusion in the second blend of plural fiber types, at step 179, a third type of fiber, preferably, a non-FR white carrier fiber or, more specifically, a non-FR white synthetic carrier fiber or, even more specifically, a non-FR white dry polyester carrier fiber is provided for inclusion in the second blend of plural fiber types and, at step 180, the white FR rayon fiber, the white dry polyester fiber and the white low melt binder fibers are blended to form the second blend of plural fiber types.

The second blend of plural fiber types can be any one of a number of suitable blends. In one embodiment, the binder fiber can be anywhere in the range of about 5 percent to about 50 percent by volume of the blend. The relative percent volume of the white FR rayon fibers to the white polyester carrier fibers may range anywhere from about 15 percent to about 85 percent. In a preferred embodiment, the relative volume of the white FR rayon fibers to the white polyester carrier fibers is roughly 50 percent to 50 percent.

Thus, for a blend having about 10 percent by volume of binder fibers and a roughly fifty to fifty percent relative volume of the white FR rayon fibers to the white dry polyester carrier fibers, the volume of white low-melt polyester binder fibers is about 10 percent, the volume of white FR rayon fibers is about 45.0 percent and the volume of white dry polyester carrier fibers is about 45.0 percent.

The method proceeds on to step 182 where a first web is formed from the first blend of plural types of fibers and step 184 where a second web is formed from the second blend of plural fiber types. The first and second webs are disposed against one another in a generally conforming relationship at step 186 and, at step 188, the bi-layer batt 62 having a first, gray FR nonwoven layer 163 composed of the first blend of plural types of fibers and a second, white FR layer 164 composed of the second blend of plural types of fibers is formed. Like the single layer, gray FR nonwoven batt 12, the bi-layer FR nonwoven batt 162 may be formed using the processing line 36 illustrated in FIG. 3 and more fully described below.

Figure 2:
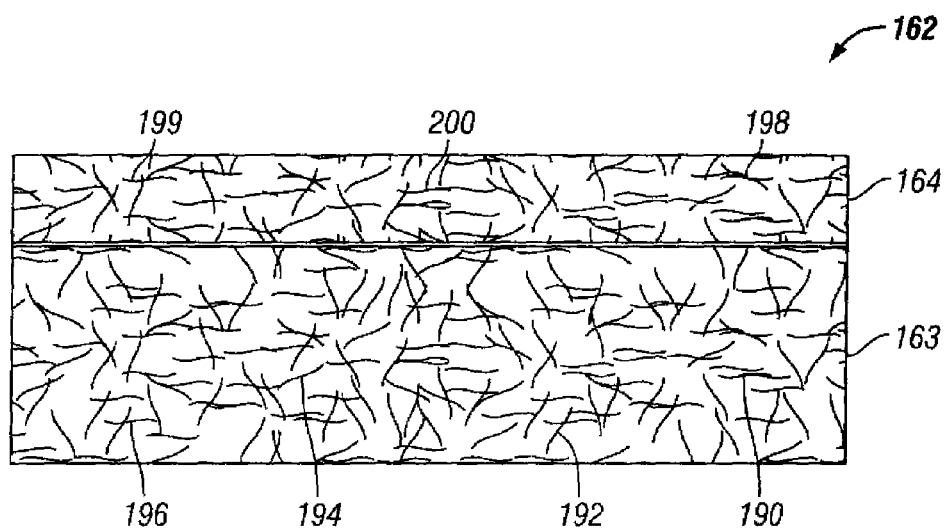
FIG. 2 is a side view of a bi-layered FR nonwoven fiber batt constructed in accordance with the method of FIG. 1 and including a first, gray, FR layer and a second, white, FR layer.

Referring next to FIG. 2, the bi-layer FR nonwoven batt 162 which, as previously set forth, includes the first, gray, FR layer 163 formed from the first blend of plural types of fibers and the second, white, FR layer 164 formed from the second blend of plural types of fibers will now be described in greater detail. As may now be seen, the first, gray, FR layer 163 is composed of a blend of black FR oxidized PAN fibers 190, white polyester carrier fibers 194 and white low-melt binder fibers 196 that adhere to one another and to the black FR oxidized PAN fibers 190 and the white polyester carrier fibers 194. The black FR oxidized PAN fibers 190 provide the first, gray, FR layer 163 with protection against burning. The black FR oxidized PAN fibers 190 also partially provide the bi-layer FR nonwoven batt 162 as a whole with protection against burning. The white polyester carrier fibers 194 provide additional comfort and aesthetics to the FR nonwoven fiber batt 162 but fail to provide any additional protection against burning.

The white FR layer 164 is composed of white FR rayon fibers 198, white dry polyester fibers 199 and white low melt binder fibers 200 that adhere to one another and to the white FR rayon fibers 198 and the white dry polyester fibers 199. As should be readily appreciated, the second, white, FR layer 164 simultaneously enhances the FR characteristic and the aesthetics of the bi-layer FR nonwoven batt 162 while maintaining the loft, comfort and durability characteristics typically attributed to the use of white dry polyester fibers. More specifically, unlike most white nonwoven layers which lack any appreciable FR characteristic, the white FR rayon fibers 198 provide the second, white, FR layer 163 with protection against burning. The white FR rayon fibers 198 also partially provide the bi-layer FR nonwoven batt 162 as a whole with protection against burning. The white polyester carrier fibers 194 provide additional comfort and aesthetics to the FR nonwoven fiber batt 162 but fail to provide any additional protection against burning.

The contribution of the white FR rayon fibers to the FR characteristic of the bi-layer FR nonwoven fiber batt 162 represents a significant departure from prior FR batts in that each layer of the bi-layer FR nonwoven fiber batt 162 provides a significant contribution to the FR characteristic of the bi-layer FR nonwoven fiber batt 162. For example, FIG. 2 shows an embodiment of the bi-layer FR nonwoven fiber batt 162 in which the first, grey, FR layer 163 is about $2/3$ of the total thickness of the bi-layer FR nonwoven fiber batt 162 while the second, white FR layer 164 is about $1/3$ of the total thickness of the bi-layer FR nonwoven fiber batt 162.

Presuming, as was presumed in copending U.S. patent application Ser. No. 11/088,658 filed on even date herewith and previously incorporated by reference, that FR characteristic of FR rayon is about $4/5$ths that of oxidized PAN, the first, grey, FR layer 163 contributes roughly $(2/3)(5)/((1/3)(4)+(2/3)(5))$ or about 71.4 percent of the FR characteristic of the bi-layer FR nonwoven fiber batt 162 while the second, wwhite FR layer 164 contributes roughly $(1/3)(4)/((1/3)(4)+(2/3)(5))$ or about. 28.6 percent of the FR characteristic of the bi-layer FR nonwoven fiber batt 162. Thus, the second, white, FR layer 164 significantly contributes to the overall FR characteristic of the bi-layer FR nonwoven fiber batt 162 as a whole.

Furthermore, because it is entirely white, the white FR layer 164 will improve the aesthetics of the bi-layer FR nonwoven batt 162 with minimal, if any, sacrifice of FR protection (when compared to a single layer, gray, FR nonwoven fiber batt having a composition generally similar to the gray FR layer 163 of the bi-layer FR nonwoven fiber batt 162) and no sacrifice of aesthetics (when compared to the two-layer fire combustion modified batt disclosed in International Patent Publication WO 01/68341 A1).

As shown in FIG. 2, the second, white, FR layer 164 is illustrated as being disposed above the first, gray FR layer 163. It should be clearly understood that the first, gray, FR layer 163 and the second, white, FR layer 164 may have various orientations relative to one another. It should be noted, however, that, in many applications, it is preferred that the white FR layer 164 is oriented such that it will enhance the visual aesthetics of the bi-layer FR nonwoven fiber batt 162. For example, if the bi-layer FR nonwoven fiber batt 162 is to be positioned beneath a mattress ticking, typically, the white FR layer 64 would be disposed against a lower side surface of the mattress ticking. Finally, it should be noted that FIG. 2 shows the white FR layer 164 as having a thickness of roughly one-half that of the gray FR layer 166 purely by way of example. More specifically, it is contemplated that the relative thickness of these two layers will vary depending on a number of considerations, including the desired FR characteristic of the bi-layer FR nonwoven fiber batt 162 and the amount of aesthetics to be added to the bi-layer FR nonwoven fiber batt 162.

For example, as previously set forth, the first, gray, FR layer 163 formed using oxidized PAN as its FR fiber is more fire resistant than the second, white, FR layer 164 formed using FR rayon as its FR fiber. Accordingly, the overall FR characteristic of the bi-layer FR nonwoven fiber batt 162 may be enhanced by increasing the thickness of the first, gray, FR layer 163 relative to the thickness of the second, white, FR layer 164. As also previously noted, nonwoven fiber batts having a white color are viewed as more aesthetic than nonwoven fiber batts having a black or gray color. Accordingly, the overall aesthetics of the bi-layer FR nonwoven fiber batt 162 may be enhanced by increasing the thickness of the second, white, FR layer 164 relative to the thickness of the first, gray, FR layer 163. In this regard, a more aesthetic FR nonwoven fiber batt is needed in those applications still requiring a nonwoven fiber batt having an FR characteristic but as a result of, for example, the use of a thinner or whiter decorative covering, a whiter FR nonwoven fiber batt is required. Of course, the foregoing are provided purely by way of example and it is fully contemplated that any number of other considerations may result in a need for a more aesthetic FR nonwoven fiber batt. For example, by lightening the color of the underlying FR nonwoven fiber batt, the product incorporating the FR nonwoven fiber batt may have a more expensive look.

Figure 3:
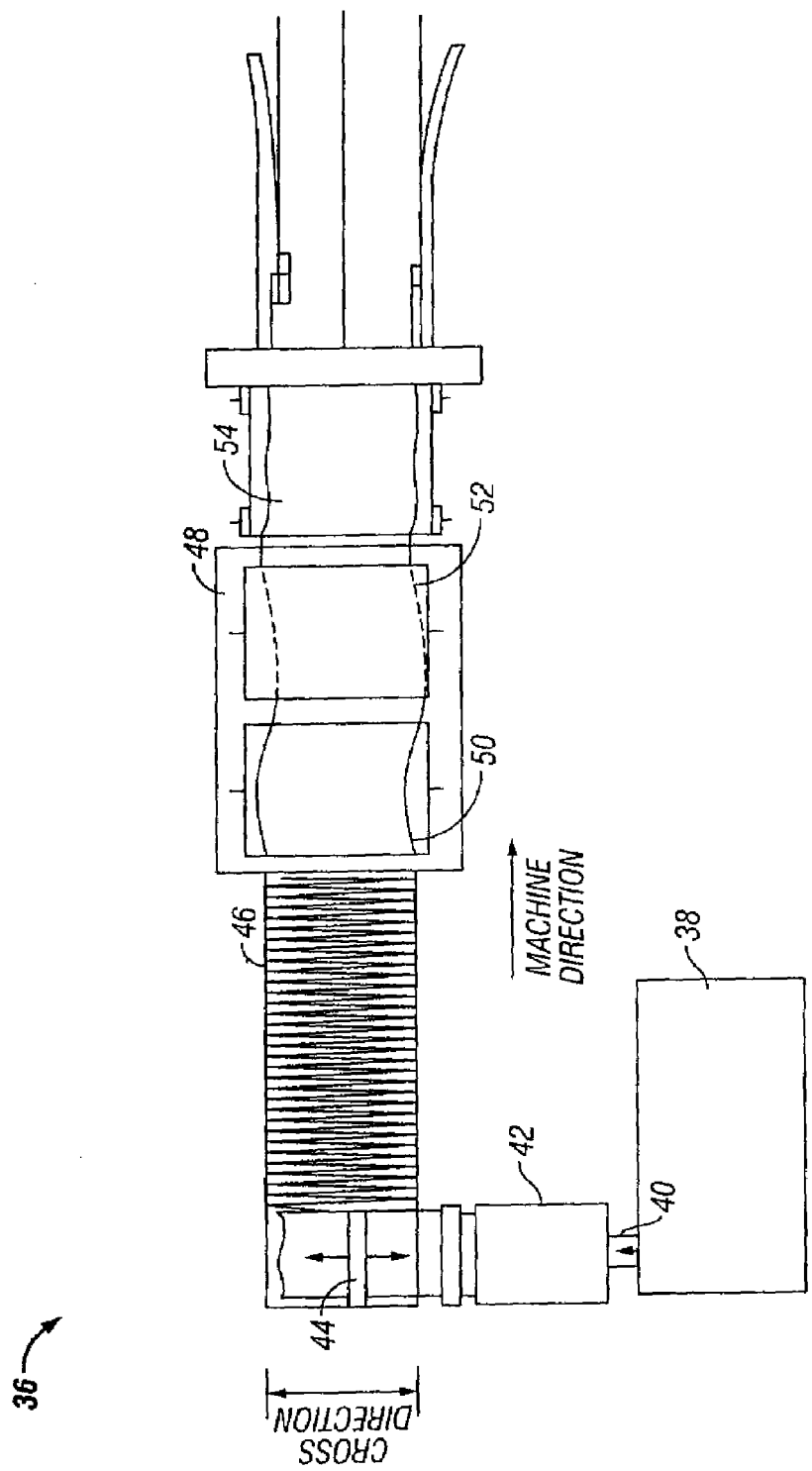
FIG. 3 is a top plan view of a processing line suitable for use in forming the bi-layered FR nonwoven batt of FIG. 2.

Referring now to FIG. 3, a schematic top plan view of a processing line 36 for constructing the FR nonwoven fiber batt 162 will now be described in greater detail. The black FR oxidized pan fibers, the white polyester carrier fibers and the white low-melt polyester fibers are blended in a fiber blender 38 and conveyed by a conveyor pipe 40 to a web forming machine 42. A suitable web forming machine is a garnett machine. An air laying machine, known in the trade as a Rando webber, or any other suitable apparatus can also be used to form a web structure. The garnett machines 42 cards the blended fibers into a nonwoven web having a desired width and deliver the web to cross-lapper 44. There, the nonwoven web is cross-lapped onto a slat conveyor 46 which is moving in the indicated machine direction. The conveyor 46 then transports the web to housing 48 for thermal bonding thereof. While there are a variety of thermal bonding methods which are suitable for the purposes contemplated herein, one such method comprises using vacuum pressure applied through perforations (not shown) in first and second counter rotating drums 50 and 52 positioned in a central portion of the housing 48 and heating the web to the extent necessary such that the relatively low melting temperature binder fibers in the web fuse the low melt binder fibers together and to the white polyester carrier fibers, the white FR rayon fibers and the black FR oxidized PAN fibers of the web. Alternatively, the web may instead move through an oven by substantially parallel perforated or mesh wire aprons to melt the low temperature binder fibers.

As it exits the housing 48, the web is compressed and cooled by a pair of substantially parallel wire mesh aprons 54, only one of which is visible in FIG. 3. The aprons 54 are mounted for parallel movement relative to each other to facilitate adjustment for a wide range of web thicknesses. The web can be cooled slowly through exposure to ambient temperature air or, in the alternative, ambient temperature air can forced through the perforations of one apron 54, through the web and through the perforations of the other apron 54 to cool the web and set it in its compressed state. The web is maintained in its compressed form upon cooling since the solidification of the low-melt polyester binder fibers in their compressed state bonds the fibers together in that state.

Of course, as would be readily appreciated by one skilled in the art, as illustrated herein, the processing line 36 is configured to form a single layer fiber batt and not the bi-layer FR nonwoven fiber batt 162 disclosed and illustrated herein. Certain modifications in the described process line 36, all of which are well within the purview of one skilled in the art, would be necessary to form a bi-layer batt such as the bi-layer FR nonwoven fiber batt 162 disclosed herein using the processing line 36. For example, absent additional equipment, the first, gray, FR nonwoven layer 163 and the second, white, FR nonwoven layer 164 would either have to be made during separate production runs and the respective grey FR and white FR layers 163 and 164 would have to be disposed in a generally conforming relationship with respect to one another prior to their transport to the housing 48. Also by way of example, the process line 36 may be provided with second fiber blender 38, conveyor pips and web forming machine. Once the first, gray, FR nonwoven layer 163 and the second, white, FR nonwoven layer 164 are formed by respective web forming machines, the grey FR and white FR layers 163 and 164 would again be disposed in a generally conforming relationship with respect to one another prior to their transport to the housing 48.

While a number of preferred embodiments of the present invention of a bi-layer FR nonwoven fiber batt and an associated method for manufacturing the same have been described and illustrated herein, it should be clearly understand that various modifications thereof may be made by one skilled in the art without departing from the spirit and scope of the teachings of the present invention and that those skilled in the art will readily see such modifications as clearly falling within the scope of the present invention. Accordingly, the embodiments described herein are exemplary only, and are not intended to be limiting. Thus, the scope of protection to be afforded the present invention should not be limited by the description set forth above, but rather, is defined by the claims which follow.

What is claimed is:

1. A bi-layer fire resistant (FR) nonwoven fiber batt, comprising:
    a first FR nonwoven fiber batt having a first side surface; and
    a second FR nonwoven fiber batt having first and second side surfaces, said first side surface of said first FR nonwoven fiber batt being disposed in a conforming relations with said second side surface of said second FR nonwoven fiber batt; wherein
    said first FR nonwoven fiber batt is formed from a blend of black oxidized polyacrylonitrile (PAN) fibers, white carrier fibers and white binder fibers; and
    said second FR nonwoven fiber batt is formed from a blend of white FR rayon fibers, white carrier fibers and white binder fibers.

2. The bi-layer FR nonwoven fiber batt of claim 1, wherein said first FR nonwaven fiber batt is darker than said second FR nonwoven fiber batt.

3. The bi-layer FR nonwoven fiber batt of claim 1 wherein said blend from which said first FR nonwoven fiber batt is formed is between about 5 percent, by volume, and about 50 percent, by volume, of white binder fibers, the remaining volume of said blend being between about 15 percent, by volume, and about 85 percent, by volume, of black oxidized PAN fibers and between about 85 percent, by volume, and about 15 percent, by volume, of white carrier fibers.

4. The bi-layer FR nonwoven fiber batt of claim 3, wherein said blend from which said first FR nonwoven fiber batt is formed is between about 10 percent, by volume, and about 15 percent, by volume, of white binder fibers and wherein said first FR nonwoven fiber batt is a high loft batt.

5. The bi-layer FR nonwoven fiber batt of claim 3, wherein said blend from which said first FR nonwoven fiber batt is formed is between about 15 percent, by volume, and about 40 percent, by volume, of white binder fibers and wherein said first FR nonwoven fiber batt is a densified batt.

6. Products using the bi-layer FR nonwoven fiber batt of claim 1, wherein said products are selected from the group consisting of bedding, upholstery, furniture, seats, apparel, fire safety gear, air filter and insulation for appliances and building, aircraft and vehicle walls.

7. Mattresses using the bi-layer FR nonwoven fiber batt of claim 1.

8. A bi-layer fire resistant (FR) nonwoven fiber batt, comprising:
    a first FR nonwoven fiber batt having first and second side surfaces, said first FR nonwoven fiber batt formed from a blend of black oxidized polyacrylonitrile (PAN) fibers, white carrier fibers and white binder fibers; and
    a second FR nonwoven fiber batt having first and second side surfaces, said first side surface of said first FR nonwoven fiber batt being disposed in a conforming relationship with a second side surface of said second FR nonwoven fiber batt, said second FR nonwoven fiber batt formed from a blend of white FR rayon fibers, white carrier fibers and white binder fibers;

wherein the color of said first FR nonwoven fiber batt is darker than the color of said second FR nonwoven fiber batt.

9. Products using the bi-layer FR nonwoven fiber batt of claim 8, wherein said products are selected from the group consisting of bedding, upholstery, furniture, seats, apparel, fire safety gear, air filter and insulation for appliances and building, aircraft and vehicle walls.

10. Mattresses using the bi-layer FR nonwoven fiber batt of claim 8.

11. The bi-layer FR nonwoven fiber batt of claim 8, wherein said blend from which said first FR nonwoven fiber batt is formed is between about 5 percent, by volume, and about 50 percent, by volume, of white binder fibers, the remaining volume of said blend being between about 15 percent, by volume, and about 85 percent, by volume, of black oxidized PAN fibers and between about 85 percent, by volume, and about 15 percent, by volume, of white carrier fibers.

12. The bi-layer ER nonwoven fiber batt of claim 11, wherein said blend from which said first FR nonwoven fiber batt is formed is between about 10 percent, by volume, and about 15 percent, by volume, of white binder fibers and wherein said first FR nonwoven fiber batt is a high loft batt.

13. The bi-layer FR nonwoven fiber batt of claim 11, wherein said blend from which said first FR nonwoven fiber batt is formed is between about 15 percent, by volume, and about 40 percent, by volume, of white binder fibers and wherein said first FR nonwoven fiber batt is a densified batt.

14. A method for forming a bi-layer fire resistant (FR) nonwoven fiber batt, comprising:

forming a first blend of black oxidized polyacrylonitrile (PAN) fibers, white carrier fibers and white binder fibers;

forming a first web of indeterminate length from said first blend of fibers;

forming a second blend of white FR rayon, white carrier fibers and white binder fibers;

forming a second web of indeterminate length from said second blend of fibers;

disposing a surface of said first web in a conforming relationship with a surface of said second web:

forming, from said disposed first and second webs, a bi-layered FR nonwoven fiber batt comprised of a first, gray, FR nonwoven layer and a second, white, FR nonwoven layer.

15. The method of claim 14, wherein said first blend is comprised of between about 5 and about 50 percent, by volume, of binder fibers.

16. The method of claim 15, wherein said first blend is comprised of between about 15 and 85 percent oxidized PAN fibers and between about 15 and 85 percent polyester carrier fibers.

17. The method of claim 16 wherein said first blend is comprised of about 45 percent, by volume, of oxidized PAN fibers and about 45 percent, by volume of polyester carrier fibers.

18. The bi-layer FR nonwoven fiber batt produced by the method of claim 17.

\* \* \* \* \*

UNITED STATES PATENT AND TRADEMARK OFFICE
CERTIFICATE OF CORRECTION

PATENT NO. : 7,132,022 B2 Page 1 of 1
APPLICATION NO. : 11/088657
DATED : November 7, 2006
INVENTOR(S) : Steven E. Ogle, D. Patrick Steagall and Kenneth C. Thompson It is certified that error appears in the above-identified patent and that said Letters Patent is hereby corrected as shown below:

Col. 12, line 13, replace "hi-layered" with -- bi-layered --

Signed and Sealed this

Twenty-fifth Day of December, 2007

JON W. DUDAS
*Director of the United States Patent and Trademark Office*